May 14, 1968        R. P. BAIRD, JR        3,383,679

VISUAL LANDING SIMULATOR FOR INSTRUMENT FLYING

Filed July 15, 1966        4 Sheets-Sheet 1

INVENTOR.

[United States Patent Office — 3,383,679 — Patented May 14, 1968]

3,383,679
VISUAL LANDING SIMULATOR FOR INSTRUMENT FLYING
Roger P. Baird, Jr., 6910 Lakewood Drive, Richmond, Va. 23229
Filed July 15, 1966, Ser. No. 565,557
2 Claims. (Cl. 343—6)

ABSTRACT OF THE DISCLOSURE

A simulating device for Instrument Landing Systems of the type which utilize airborne TV receivers in connection with ground based model airport, TV camera, TV transmitter, radar and simulating device all for providing blind flying pilots with simulated views of their airport. This simulating device supports and moves the TV camera in positions, relative to model airport, representative of aircraft's position relative to real airport. The radar tracks the aircraft and directs the simulating device.

---

This invention relates to instrument flying, specifically to orientation in airport area and finds its most use in instrument approaches and landings.

Current Instrument Landing Systems, or ILS's, are very demanding on pilots and consume extra time. While using, pilots receive technical position data which must be converted into mental pictures of position. Extra time is required, over visual approaches, for many precise procedures necessary to get an aircraft into a known position and heading from which to make a final approach and landing.

A pilot's use of this invention can be described by visualizing a pilot making a night flight into an isolated strip under conditions of high overcast (no stars or lights in sky and no visible horizon), no lights on ground other than runway markers and no landing lights. This pilot receives complete orientation for a full or abbreviated pattern and a landing from looks at his landing rectangle. Likewise, carrier pilots making hazy day or dark night landings oftentimes have no surface of the earth visual references other than sight of their landing deck. Without sight of the rectangle, these pilots would be making instrument approaches, but with it and use of their instruments, they make approaches with visual conditions efficiency.

The rectangle of a landing strip is a pilot's home. Nothing else represents more security to a pilot than sight of this rectangle, when needed. An experienced pilot has the ability to orientate himself by images imposed on his brain by viewing the rectangle of his landing strip from several of an infinite number of physical viewpoints. Sighting of surface of the earth objects other than the landing strip is not necessary for safe approaches and landings.

The object of this invention is to provide instrument flying pilots with a TV-transmitted image of a ground-simulated view of the pilot's actual view of his landing strip from his current physical viewpoint. This image is available regardless of visibility conditions.

My system allows simulated visual approaches and landings under instrument conditions by giving instrument flying pilots complete, pictorial and continuous aircraft vs. airstrip orientation information in a manner which is best applied to the computer, known as the pilot's brain, for easiest and fastest feed through and thus for best results. This computer, or pilot's brain, is the master of the craft. To this computer my invention feeds better ingested information than current ILS's.

Figure 1:
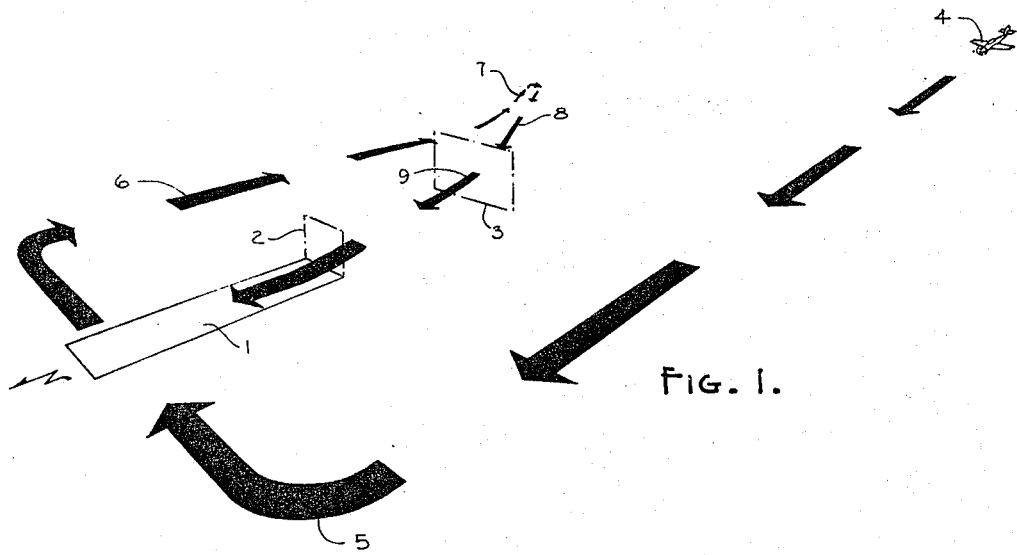
FIG. 1 shows a landing strip with an aircraft and its typical landing approach with ILS.
Figure 1A:
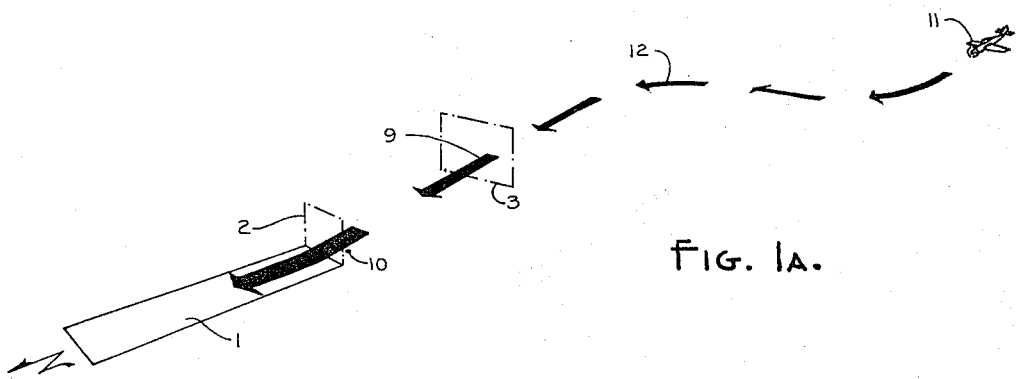
FIG. 1a shows a landing strip with an aircraft and its typical landing approach either under visual conditions or with my device under instrument conditions.

Referring to the drawings, FIG. 1 and FIG. 1a show a North or 0° heading landing strip 1, with threshold 2 and threshold 3. In order to make safe landings, it is generally conceded that all non-vertical landing aircraft should pass through a threshold 3 to begin its final approach and pass through a threshold 2 just prior to landing. The more sophisticated the aircraft, the more specific, well-defined, and smaller is each threshold, although threshold 3 is always larger than threshold 2, for any given aircraft.

Under visual conditions, pilots fly their aircraft in shortest practical route to obtain a runway heading through threshold 3, as shown in FIG. 1a for aircraft 11, through its flight path 12, considering what is allowed by control, traffic and obstructions. However, a pilot under instrument conditions using current ILS's would have to fly a path similar to aircraft 4 of FIG. 1, through its flight paths 5, 6, 7 and 8 to reach point 9 in threehold 3. My device allows a direct let down, under instrument conditions, such as aircraft 11, FIG. 1a, through flight path 12, to point 9, within threshold 3.

My system consists of airborne TV receiver screen for pilot with ground radar, simulator with TV camera and a TV transmitter. The ground radar locates and tracks the aircraft and sends azimuth, elevation and distance measurements, of the aircraft with respect to the landing strip, to my simulator. My simulator supports and moves a TV camera over and around a model of the landing strip. My simulator, following instructions from the radar, moves the camera so as to keep it at points, with reference to model runway, representative of actual aircraft location with respect to actual runway. The TV camera is supported by the simulator so that its focal or aiming point is fixed. The model runway is supported, by the simulator, so as to include, on its surface, the camera's fixed focal or aiming point. The image picked up by the TV camera is transmitted to the pilot's screen as a simulated picture of his landing strip from his current physical viewpoint.

Figure 2:
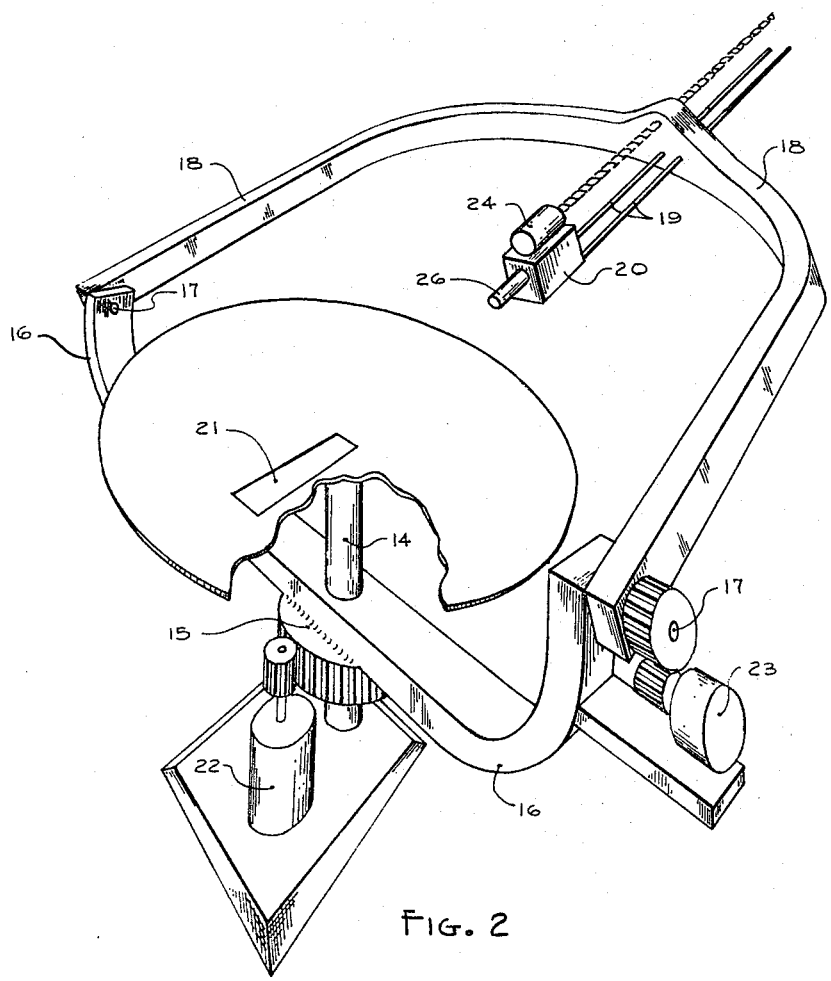
FIG. 2 shows details of my simulator.

FIG. 2 shows details of my simulator in which fixed vertical base member 14, holds model of landing strip 21. Azimuth moving sleeve 15, rotates about fixed vertical base member 14, and is powered by power azimuth movement follower 22, which is responsive to signals received from radar 10, FIGS. 1 and 1a. Azimuth arms 16, extend from azimuth sleeve 15, so as to be rotatable about strip model 21, and hold horizontal bearings 17. on which elevation arms 18, rotate in elevation, powered by elevation follower 23, which is responsive to signals from radar 10, FIGS. 1 and 1a. Elevation arms 18, support traverse mounting units 19 on which TV camera 20, moves inward and/or outward, powered by power distance movement follower 24, which is responsive to signals from radar 10, FIGS. 1 and 1a.

Thus in operation, radar 10, determines distance to aircraft and the power distance movement follower 24, responsive to signal of distance from radar, moves the TV camera to a representative distance from the runway model. The distance set, of the camera, is representative of the ratio of model size to runway size. Likewise, elevation and azimuth signals from radar are picked up by the simulator's respective power movers which result in the camera being supported at a point, with respect to the model, representative of the actual aircraft's position with reference to the actual runway. Thus the TV camera is transmitting to the pilot an exact and continuous image of his landing strip from the pilot's current physical viewpoint.

Obviously other similarly performing mechanical devices can be used to support the camera at correct relative positions, with reference to the model runway, or support the model runway at correct relative positions with reference to a fixed camera. Or the camera can move in one or two dimensions and model move in others. Also it is obvious that a full model airport and its surroundings may be used in the simulator as well as a single runway. All such combinations and/or variations are included herein.

Pilots of sophisticated aircraft, under visual conditions, generally use the following to get themselves into threshold 3, FIG. 1a, with the proper heading:

(a) Sighting of runway for proper heading with runway.

(b) Sighting of runway for proper alignment with runway.

(c) Sighting of runway and/or other ground objects plus check of altimeter for proper altitude.

(d) Sighting of known landmarks, depth perception and/or estimate of approximately one runway's length away from runway for proper distance from runway.

Pilots of sophisticated aircraft, under instrument conditions, using my system generally use the following to get themselves into threshold 3, FIG. 1a, with the proper heading:

(a) Sighting of runway image on TV screen for proper heading.

(b) Sighting of runway image on TV screen for proper runway alignment.

(c) Sighting of runway image on TV screen and particularly its angle, plus check of altimeter for proper altitude, plus use of later described, super-imposed on TV picture, radar reading of altitude.

(d) Sighting of runway image on TV screen plus check of later described superimposed on TV picture, radar reading of distance from runway, for proper distance from runway.

Pilots of less sophisticated aircraft use $a$ and $b$ and diminishing degrees of $c$ and $d$, two preceding paragraphs, for visual and/or instrument landings with my system.

Thus an instrument flying pilot using my device has instrument landing opportunities equal in ease to visual flying pilots.

Figure 3:
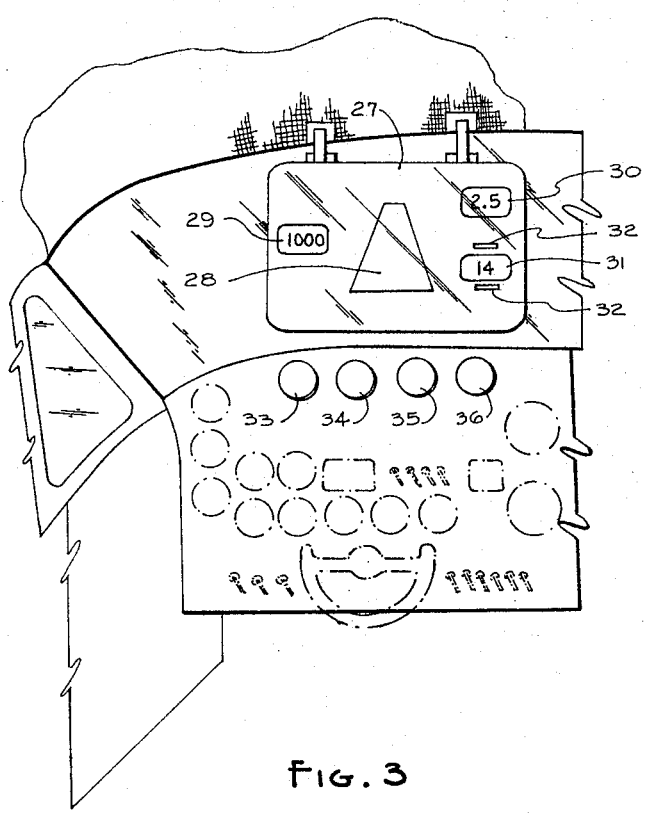
FIG. 3 shows pilot's indicator of my invention.

In FIG. 3 is shown pilot's TV screen in its flip-in position of a sunvisor type flip-in, flip-out mounting. For instrument flying, this takes advantage of the otherwise relatively useless pilots windshield area. In FIG. 3 the screen shows strip image 28, with super-imposed radar reading of altitude 29, and radar reading of distance 30. Both of these readings are super-imposed onto TV picture before transmission from the ground. Thus the instrument flying pilot of an aircraft, using my system, has a clear and life-size picture of all he needs to fly his craft directly into a threshold which is the initial portion of his final approach. Also landings can be accomplished under zero conditions. Smaller size screens can be installed in instrument panels.

Figure 4:
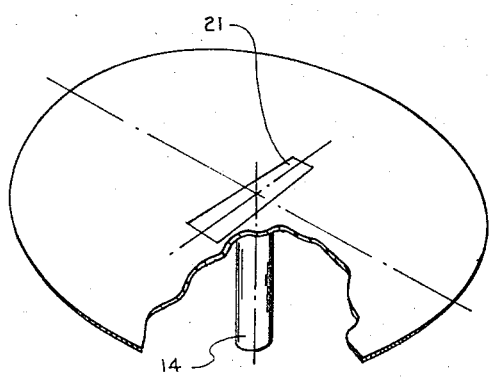
FIG. 4 shows alternate placement of runway model in my simulator.
Figure 4A:
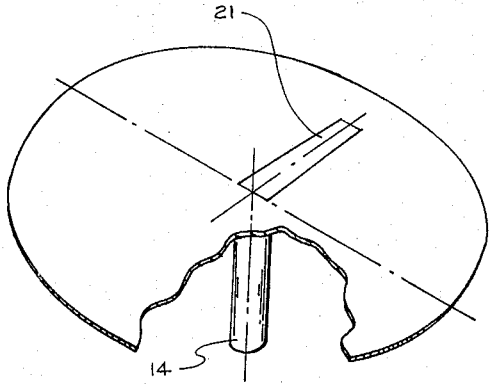
FIG. 4a shows another alternate placement of runway model in my simulator.

FIG. 4 and FIG. 4a show different strip model 21, mountings on shaft 14, of FIG. 2. These different mountings place the pilot's eye sight focal point at different locations along the strip and also affect the later described cone of ineffectiveness of my simulator. When visibility is zero, a mounting as in FIG. 4a is appropriate for takeoff. A middle of the runway location such as in FIG. 4 allows both landing and takeoff without changing radar location or placement of model, however it requires adjustment and/or corrections to be made in transmitted data from radar to simulator to make up for radar being off center of runway.

Figure 4B:
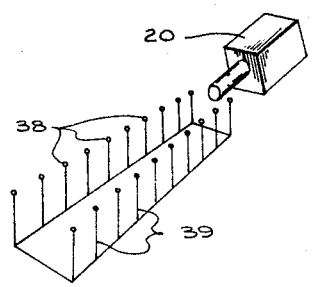

FIG. 4b shows a model runway with lights 38 mounted as runway markers on vertical, flexible mounts 39. For zero visibility landings, when guidance to actual touchdown is needed, such mountings allow TV camera to obtain a more realistic closeness to the runway level. The flexible light holders, thru collapsing after being hit by the TV camera, allow center line of camera lens to come down to simulated ground level.

Optimum performance with my system includes use of two simulators and/or two TV transmitters for a landing aircraft and several other simulators-transmitter combinations so that stacked up aircraft may be fed in at rates as fast as visual feed-ins, even to two runways. The two sets for a landing craft are used, one for guidance to the runway and the other for guidance to actual touchdown.

Figure 5:
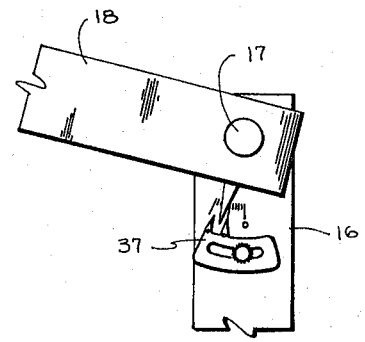
FIG. 5 shows details of my simulator's glide slope indicator warning limit switch.

On initial tower call, while using my device, pilots state their desired angle of glide path for final approach which is appropriate for themselves and their aircraft. The ground operator will set this on my device's glide slope limit switch 37, of FIG. 5 which is located at one of the horizontal bearings 17, of FIG. 2. The angle set, say 14°, will show super-imposed on pilot's TV picture at 31, FIG. 3 with light bars 32, FIG. 3, responsive to actions of the elevation arms against the limit switch, either above or below the angle set, to show the pilot of an adverse condition of actual height.

My invention includes a ground located tape-recording of the TV picture as a record of the pilot's performance. Also included is a live showing of the performance on the passengers' TV screen for added entertainment.

FIG. 3 shows airspeed indicator 34, and artificial horizon 33, mounted at top of pilot's instrument panel, in near view of my TV screen indicator to aid pilots in ease of seeing required information for making instrument approaches and landings. Also shown is ADF 33, close by to TV screen. This is to be used with an added ground radio transmitter, near my radar screen 10, FIG. 1, for pilot's determination of direction of strip. This will eliminate any possible confusion since the TV screen shows a picture as if the pilot had rotated his head, looked over his shoulder or otherwise rather than necessarily showing what's straight ahead. Also shown in FIG. 3 is aircraft radio altimeter 36, close by TV screen for added pilot's information in flareouts and runway touchdowns under zero conditions.

The TV camera in my simulator includes a powered and automatic zoom lens adjustment 26, FIG. 2 which allows more realistic images on the pilot's indicator, particularly when the airplane is beyond the mechanical distance limitations of the simulator. This zoom lens setting is responsive to radar distance signals.

My simulator's elevation movement is restricted so that 90° elevation can not be accomplished. This prevents "flop over" or upside down position of the TV camera. Thus an aircraft passing directly overhead would be followed by the simulator to a point just under 90°. As the plane passed over, my simulator's azimuth is quickly rotated 180° and then follows with elevations under 90°. This leaves a small cone of ineffective area directly above the focal point of my simulator. This ineffective area does not restrict the effectiveness of my system inasmuch as no critical maneuvers are involved in the area of this small cone.

Having described my system and its simulating device, the portability of same is obvious. For military or other operations, my device is easily and quickly set up to operate with a ground radar set. Alignment with runway and installation of proper representative runway model in simulator are only required adjustments for adaptation to any landing strip. Thus my device is effective either as a portable or permanent installation.

I claim:

1. A simulating device for an Instrument Landing System of the type which utilizes airborne TV receivers and ground based model airport, TV camera, TV transmitter, radar for tracking aircraft and simulating device, all providing blind flying pilots with a simulated view of their airport, said simulating device supporting and moving a TV camera in positions, relative to fixed model airport, representative of aircraft's position relative to real airport, with azimuth, elevation and distance servo motors of said simulating device being directed by radar trackings of aircraft positions of azimuth, elevation and distance from real airport, said simulating device comprising model airport holding means of a fixed vertical shaft and camera supporting means of a rotatable azimuth sleeve around said fixed shaft with one end of extended azimuth arms fixed to said azimuth sleeve and opposing ends of azimuth arms supporting horizontal bearings, said bearings being on a common axis, said axis being in horizontal plane of model airport, said model being between said bearings, and elevating arms with one end attached to mating bearings of said horizontal bearings allowing rotational movement of elevating arms about said common axis, and opposing ends of said elevating arms being formed together into a guide plate containing traction and guide means of multiple open bores, of parallel axis, one of said bores being internally screw threaded, and camera support and traversing means of multiple rods for mating into said bores with one rod being externally screw threaded for traction with said threaded bore, said rods being affixed, one end, to a camera support box wherein TV camera is mounted, and said azimuth sleeve having gear attached and said gear being engaged and driven by a pinion attached to a fixed azimuth servo motor, and said elevating arms having gear attached and said gear being engaged and driven by pinion of elevation servo motor which is bracketed to an azimuth arm, and said threaded traction rod being driven by distance servo motor which is attached to said camera support box.

2. A simulating device for an Instrument Landing System of the type which utilizes airborne TV receivers and ground based model airport, TV camera, TV transmitter, radar for tracking aircraft and simulating device, all providing blind flying pilots with a simulated view of their airport, said simulating device supporting and moving a TV camera in positions, relative to fixed model airport, representative of aircraft's position relative to real airport, with individual lights as boundary markers of landing area of said model airport and said lights being on individual, vertical column mountings and said columns being of a flexible material.

References Cited
UNITED STATES PATENTS

| | | | |
|---|---|---|---|
| 2,959,779 | 11/1960 | Miller et al. | 343—6 |
| 2,979,832 | 4/1961 | Klemperer | 35—12 |
| 3,012,337 | 12/1961 | Spencer et al. | 35—12 |
| 3,076,271 | 2/1963 | Marvin et al. | 35—12 |
| 3,205,497 | 9/1965 | Swadell | 343—108 |
| 2,711,593 | 6/1955 | Lewis et al. | 35—12 |
| 3,212,082 | 10/1965 | Robinson et al. | 343—6 |
| 3,292,176 | 12/1966 | Crane | 343—108 |
| 3,327,099 | 6/1967 | Nelson et al. | 343—108 X |

EUGENE R. CAPOZIO, *Primary Examiner.*

R. W. WEIG, *Assistant Examiner.*